Jan. 16, 1945.  A. J. DAVIS  2,367,388
ILLUMINATED AIRCRAFT
Filed Oct. 19, 1942
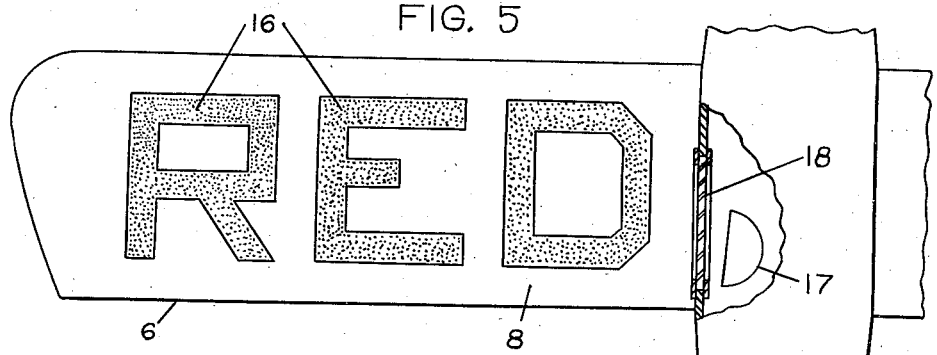
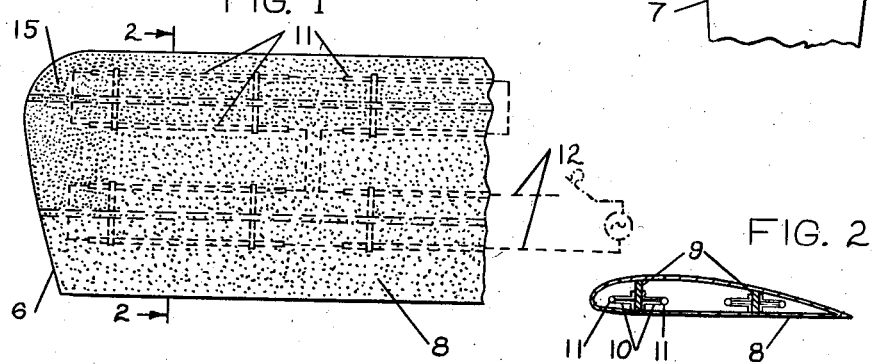
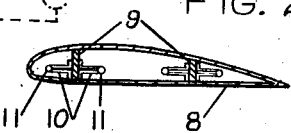
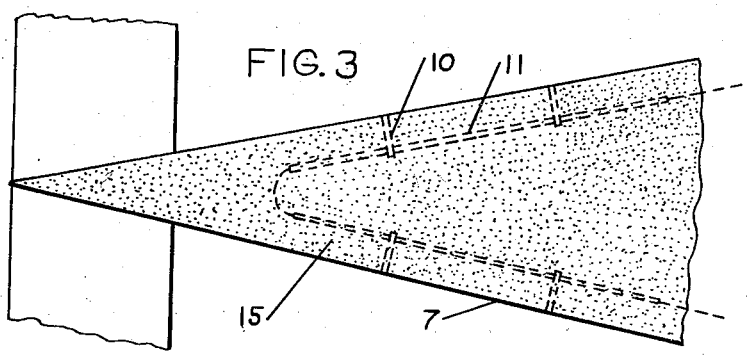
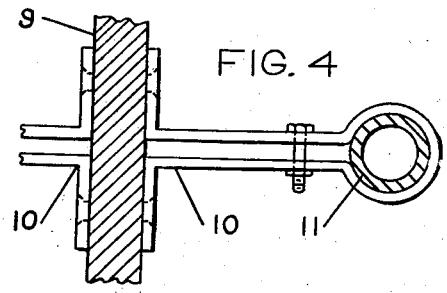
INVENTOR
Arthur J. Davis
BY
Wheeler, Wheeler and Wheeler Patented Jan. 16, 1945

2,367,388

UNITED STATES PATENT OFFICE 2,367,388

ILLUMINATED AIRCRAFT

Arthur J. Davis, Milwaukee, Wis.

Application October 19, 1942, Serial No. 462,539

9 Claims. (Cl. 250—71)

This invention relates to improvements in illuminated aircraft.

It is the primary object of the invention to provide without undue heat for the direct illumination of the skin or envelope of an aircraft surface, while desirably avoiding any exposure of the lighting equipment and any impairment of the aero-dynamic qualities of the aircraft.

The objective is to make the aircraft, or some selected portion of the aircraft, conspicuously visible either from the air or from the ground or from both points of view, thereby adapting the invention for use not only in the promotion of safety, but also in the field of advertising.

In the past, insofar as aircraft have been illuminated, the illumination has been inadequate from a safety standpoint. Incandescent lamps have commonly been used to illuminate the so-called "flying lights" of red and green carried at the wing tips. Such flying lights, because of their slight area and low power, have not been sufficiently conspicuous and, particularly from the point of view of a higher aircraft against a background of such numerous night lights as are found in the vicinity of cities, the aircraft flying lights have been perceptible only with difficulty.

Several considerations have precluded the use of more conspicuous flying lights heretofore. In the first place, the illumination of large areas has involved considerable weight of equipment and the power requirements for the energization of incandescent bulbs of such high candle power as to be conspicuous in small sizes are excessive from the standpoint of the increased weight of battery or generator equipment required. In the second place, the heat given off by many lights or lights of high candle power is so great as to make it undesirable to have these housed within the wing. Moreover, insofar as a lamp is housed within the wing it is not fully visible and it is difficult to provide any window space through which the light is visible at wide angles without impairing the streamline surfaces of the wing or exposing margins of the wing covering in such a manner that they are apt to be torn. In the third place, it is very objectionable to have such lights exposed at the outside of the wing because, when exposed, they introduce a new source of air resistance and, moreover, become liable to breakage.

What has been said as to flying lights is even more serious with regard to lights carried by aircraft for advertising purposes. In order to make advertising material clearly legible from the ground, while the aircraft remains at a safe height above a city, it is necessary to use a rather high degree of illumination involving either a large area of illumination or very substantial power requirements or both. These, in turn, will develop in previously known devices, excessive heat within small space in the aircraft or, alternatively, an excessive amount of resistance to movement of the equipment if disposed exteriorly.

I also desire to be able to control the lighting as to color, location and operation.

By the invention herein disclosed, I have solved problems involved in the illumination of aircraft both for safety purposes and for advertising, in a manner which requires a minimum of power, develops little heat, and provides little or no exposed equipment to reduce the efficiency of the aerofoils. The invention will be more specifically understood and other objectives appreciated by those skilled in the art upon examination of the following disclosure.

In the drawing:

Fig. 1 is a fragmentary bottom plan view of a portion of an aeroplane wing embodying my invention.

Fig. 2 is a detail view of the wing in cross section on the line 2—2 of Fig. 1.

Fig. 3 is a bottom plan view on an enlarged scale of the rear end portion of the fuselage of an aeroplane embodying my invention.

Fig. 4 is a detail view on a still further enlarged scale showing in elevation a bracket such as may be used for the support of the activating equipment within the aerofoil skin or wing cover in accordance with my invention.

Fig. 5 is a fragmentary bottom plan view of a modified embodiment of the invention.

Like parts are identified by the same reference characters throughout the several views.

As is well known in the art, aircraft are conventionally made up of the relatively light skin or envelope which, in some aeroplanes, is made of metal or wood but which, in other airplanes and in dirigible balloons, is made of fabric or plastic. The skin or envelope of fabric may, in the case of heavier than air machines, be stretched over a skeleton framework and in the case of dirigibles and other balloons, is held distended by pressure of a gas. The present invention contemplates that regardless of the character of the skin or envelope which provides the actual aerofoil of the aircraft, such skin or envelope shall itself be rendered highly luminous as distinguished from any arrangement for hanging luminous bodies from it or mounting luminous bodies within it before windows through which such bodies may be viewed. In accordance with the present invention it is the aerofoil surface itself which is the luminous body. I have selected for illustration two different ways for accomplishing this result.

In the construction shown in Figs. 1 to 4 inclusive, the wing 6 and the fuselage 7 comprise aerofoil surfaces having an envelope or covering at 8 which is held suspended by the conventional interior framework which includes, in the case of the wings, interior spars at 9. Upon these spars I mount brackets 10 (Fig. 2 and Fig. 4) of any desired type for the support of any desired form of a generator 11 of rays capable of activating fluorescent material. In accordance with the objectives of this invention the generator will preferably be one which will operate at a low temperature and ordinarily it will generate ultra violet rays, most of which are outside of the visible light spectrum.

The generator shown at 11 may constitute a tubular "lamp" of the gaseous discharge type filled with such gases as the vapors of mercury or argon or both. While the generators 11 have been referred to and are frequently referred to as lamps, it will be understood that they are preferably not used for direct illumination, or for any illumination in any ordinarily accepted sense. Such visible light as issues therefrom is purely incidental to their development of ultra violet rays when connected, as by the wiring indicator at 12 (Fig. 1) to any suitable source of high frequency excitation (not shown). As indicated in Fig. 1, a number of the activating tubes may be connected together to a single source. Fig. 1 illustrates this point by showing a series connection diagrammatically indicated in dotted lines.

The activating tubes 11 are within the wing. On the exterior surface of the wing covering 8 which constitutes the actual aerofoil surface I provide a coating in the nature of paint which comprises or contains a material highly luminescent when activated by rays such as those given off by the tubes 11. This coating may cover the entire surface of the aerofoil as indicated by the stippling 15 in Fig. 1 and Fig. 3, or it may be limited to specific areas as indicated by stippling at 16 in Fig. 5. The extent and shape of the area covered by the luminescent material will depend upon the purpose for which the illumination of the aircraft is desired.

Instead of being fluorescent, the material may also be phosphorescent, the distinction technically depending upon whether the material which glows when activated retains its capacity to give off light only for the period of activation, or whether it continues to give off light after activation ceases. Numerous materials of both types are widely known, including luminous zinc sulfide, calcium sulphide, platino-cyanid of barium, silicate of zinc, calcium tungstate, anthracene, etc. All such material, whether it fluoresces or it is phosphorescent, is hereinafter generically called luminescent.

Fig. 3 shows the same brackets 10 and activating tubes 11 within, and a comparable luminescent coating at 15 applied to the under surface of, the fuselage portion 7 of an aeroplane. It will, of course, be understood that the surfaces thus rendered luminescent may include all of the surfaces of the aircraft or may be limited to upper surfaces or lower surfaces or parts thereof. By switching the activating tubes on or off, the operator may control the portion of the aircraft which is rendered luminous.

Since different substances fluoresce and phosphoresce in different colors, when activated, it is possible to obtain any color scheme desired. One entire wing of an aeroplane may be made to glow with red light, while the other wing glows with green light. For military aviation it may be desirable to limit the illumination either to the upper or the lower surfaces, according to circumstances, so that the plane thus treated will be conspicuous from one direction and not from another.

The constructions illustrated in Figs. 1 and 4 inclusive presuppose that the aerofoil sheath or envelope is of such a character that it can be penetrated by the activating rays. In fact most of the materials usable for the envelopes of aerofoils may be penetrated by activating rays if a proper choice of such rays is made. The luminescent materials can not only be activated by ultra violet rays, but also by radium or X-rays and many others. If radium is used for activation a powdered compound or ore containing radium may be mixed with the paint which also applies the luminescent material to the aerofoil surface, thus eliminating any electrically energized activating means, and further eliminating any problem of penetrating the skin or envelope of the aerofoil.

However, it is possible without exposing an ultra violet actuator to the air stream traversing the aerofoil, to energize luminescent material on the surface of an envelope which is impervious to ultra violet. One manner of accomplishing this is shown in Fig. 5 wherein an ultra violet lamp 17 is mounted within the fuselage 7 and directed outwardly through a "window" 18 of material readily permeable by ultra violet rays, the arrangement being such that the source thus housed within the aerofoil surfaces of fuselage 7 activates the symbols 16 painted in fluorescent or phosphorescent material upon the wing 6.

It will, of course, be understood that the three types of activation herein suggested may be used interchangeably or concurrently, as desired. In the event that definite symbols such as those indicated at 16 in Fig. 5 are to be rendered luminescent by the use of tube generators such as those shown at 11 in Fig. 1, it is important that little or no visible light be emitted by the tubes 11 in such a manner as to be apparent from the standpoint of a spectator. It will be found that many conventional wing coverings, including the usual doped fabric, will serve as filters to intercept the visible light while permitting the ultra violet radiation to pass through for the activation of the luminescent material on the surface.

I claim:

1. An aircraft comprising a member provided with a surface skin and a hollow behind said skin, a luminescent material on the surface, and means behind said skin for generating an activating ray by which said skin is permeable.

2. In an aircraft having a hollow interior and an aerofoil surface provided with a skin, a luminescent material on the exterior surface of the skin, and means housed within the hollow interior of the aircraft for directing activating rays upon such material to render such material luminescent.

3. The combination with an aeroplane wing having a hollow interior and a covering skin, of a luminescent material on the external surface of said skin and a cool source of rays for the activation of such material disposed within the hollow interior of said wing, said skin being permeable to said rays.

4. The combination with an aeroplane wing having a hollow interior and a covering skin, of a luminescent material on the external surface of said skin and a cool source of rays for the activation of such material disposed within the hollow interior of said wing, said skin being permeable to said rays and said source comprising a lamp type ultra violet generator, said skin being adapted measurably to filter rays of visible light from the discharge of such generator while permitting the passage of ultra violet rays in quantities sufficient to activate said material.

5. An aeroplane comprising a wing provided on its lower surface with an area of symbolic form provided with a luminescent coating and means for activating said coating comprising a cool operating vapor lamp housed within the wing and giving off activating rays by which the wing is permeable.

6. An aeroplane comprising a wing provided on its lower surface with an area of symbolic form provided with a luminescent coating, and means for activating said coating, said aeroplane comprising a fuselage in which said activating means is housed, said activating means being directed through one side of the fuselage upon the area of the wing which is coated with luminescent material.

7. An aeroplane having an exposed surface directly coated exteriorly with luminescent material and a wholly enclosed means for activating such material.

8. The article of claim 7 in which said means is electrically energized for activating said material, and is provided with circuit connections therefor including a switch whereby said material may be activated and de-activated at will to render that portion of the aeroplane upon which such material is coated either luminescent or non-luminescent as desired.

9. As a new article of manufacture, an aeroplane having an aerofoil of which at least a substantial area of its entire exterior surface is coated with a material luminescent when activated, said aerofoil being provided with a ray generator for activating such material, whereby to render luminescent the entire aerofoil surface coated therewith.

ARTHUR J. DAVIS.